United States Patent
Liou

(10) Patent No.: US 6,955,341 B2
(45) Date of Patent: Oct. 18, 2005

(54) APPARATUS FOR DISSOLVING GAS INTO LIQUID

(76) Inventor: Huei-Tarng Liou, 3F, No. 6, Alley 20, Lane 85, Chang-Hsing Street, Taipei (TW)

( * ) Notice: Subject to any disclaimer, the term of this patent is extended or adjusted under 35 U.S.C. 154(b) by 340 days.

(21) Appl. No.: 10/410,772

(22) Filed: Apr. 10, 2003

(65) Prior Publication Data

US 2004/0131514 A1 Jul. 8, 2004

(30) Foreign Application Priority Data

Jan. 3, 2003 (TW) ........................................ 92100087 A

(51) Int. Cl.$^7$ ................................................ B01F 3/04
(52) U.S. Cl. ....................... 261/64.1; 261/76; 261/79.2; 261/DIG. 42; 261/DIG. 75
(58) Field of Search ......................... 261/64.1, 76, 79.2, 261/121.1, 124, DIG. 42, DIG. 75

(56) References Cited

U.S. PATENT DOCUMENTS

| | | | | |
|---|---|---|---|---|
| 4,207,180 A | * | 6/1980 | Chang | 210/612 |
| 4,992,216 A | * | 2/1991 | Saita et al. | 261/122.1 |
| 5,865,995 A | * | 2/1999 | Nelson | 210/205 |
| 5,968,352 A | * | 10/1999 | Ditzler | 210/220 |
| 6,207,064 B1 | * | 3/2001 | Gargas | 210/752 |
| 6,264,174 B1 | * | 7/2001 | Chang et al. | 261/29 |
| 6,464,210 B1 | * | 10/2002 | Teran et al. | 261/79.2 |
| 6,534,023 B1 | * | 3/2003 | Liou | 422/186.18 |
| 6,565,070 B2 | * | 5/2003 | Batterham et al. | 261/36.1 |
| 6,679,484 B2 | * | 1/2004 | Hattori | 261/64.1 |
| 6,808,637 B2 | * | 10/2004 | Cho | 210/744 |

* cited by examiner

Primary Examiner—Scott Bushey
(74) Attorney, Agent, or Firm—Senniger Powers

(57) ABSTRACT

An apparatus for effectively dissolving gas into liquid medium to obtain high concentration of gas solution includes a mixer and a tank enclosure, wherein the mixer primarily includes a quasi-Venturi tube and an expansion chamber. During operation, gas is introduced into the liquid in the quasi-Venturi-typed mixer. A valve mounted at the inlet of the mixer is used to regulate the gas flow so that the flow rate of the gas entering the mixer is lower than the rate of the gas drawn into the quasi-Venturi tube. With the gas drawn-in capability of the quasi-Venturi tube, gas can be mixed with the liquid flow through the quasi-Venturi tube under negative pressure and forms small gas bubbles in the liquid. The liquid carrying small gas bubbles flows out of the mixer, and subsequently flows into the tank enclosure and forms a whirlpool therein. As such, the gas bubbles can remain in the liquid for a prolonged time, which helps the gas dissolve in the liquid. The mixing apparatus is applicable for producing high gas concentration of water.

9 Claims, 3 Drawing Sheets

APPARATUS FOR DISSOLVING GAS INTO LIQUID

CROSS-REFERENCES TO RELATED APPLICATIONS

This application claims the benefit of Taiwan application serial number 092100087, filed on Jan. 3, 2003, the benefit of which is hereby claimed under 35 U.S.C. Sec. 119(a).

STATEMENT REGARDING FEDERALLY SPONSORED RESEARCH OR DEVELOPMENT

Not Applicable

DESCRIPTION

1. Field of Invention

The invention relates to an apparatus for dissolving gas into liquid.

2. Background

In many industrial applications, gas solutions are usually needed. However, most gases cannot easily dissolve in water. Generally, a gas solution would not achieve the desired purpose if the concentration of the gas is too low. Without some special processing procedures, a solution with low gas concentration cannot be used in real application. Therefore, an apparatus for producing high concentration of gas solution is desperately needed in commercial applications. An apparatus for producing gas solution with high concentration can be implemented to different applications. Specifically, solutions with high concentration of oxygen and carbon dioxide are useful for high-density aquaculture, and solutions with high ozone concentration can be used in semiconductor wafer cleaning. Generally, the ozone concentration has to be at least 50 ppm for practical applications. These are only two examples of the many applications of solutions with high concentration of gas.

A widely used method for dissolving gas in water is to introduce gas into water through an orifice placed within the water. This method increases surface contact area between gas and water, and accordingly increases the rate of gas dissolving in water. Physical methods, such as lowering the temperature of water, and increasing the pressure in an enclosure containing the water and gas, may be applied to increase the rate of gas dissolving in water. Chemical reactions between the dissolved gas and the liquid medium, or reactions between the gas and other solutes dissolved within the liquid, may also increase the rate of gas dissolving in liquid; the effect, however, is not within the scope of the present invention, and thus is not to be discussed in this specification.

In addition to the methods by which increasing temperature and pressure is used, researchers have constantly been in search for other methods for increasing rate of gas dissolving in liquid at reasonable costs. The present invention is directed to a method of dissolving gas in liquid at low cost.

SUMMARY OF INVENTION

The object of the present invention is to provide an apparatus for mixing liquid and gas, in which not only the methods of lowering the temperature of liquid and increasing pressure of liquid/gas are used, measures of introducing gas at negative pressure and using liquid whirlpool to trap the bubbles formed therein are also applied in order to obtain higher rate of gas dissolving in the liquid.

The specific measure adopted in the present invention is to introduce the gas generated by a gas generator to a mixer in which a valve is used for regulating the gas flowing into the mixer. The mixer comprises primarily a gas expansion chamber and a device similar to a Venturi tube. One of the examples was described in U.S. application Ser. No. 09/669,956, filed on Sep. 26, 2000, now U.S. Pat. No. 6,534,023, and hereinafter is generally referred to as quasi-Venturi tube. The 09/669,956 application is incorporated as part of the subject application as reference, in which the quasi-Venturi tube is described to pass longitudinally through an expansion chamber. In the present invention, a pump is used for pumping the fluid so that the fluid may circulate in the claimed apparatus. When the fluid flows through the quasi-Venturi tube, a suction effect is generated. Gas in the expansion chamber is sucked into the quasi-Venturi tube and carried away by the fluid. At the beginning of the operation, the gas generated by the gas generator is introduced into the expansion chamber. A valve is mounted at the inlet of the expansion chamber to regulate the gas flowing into the expansion chamber so that the quasi-Venturi tube draws in the gas in a rate greater than the flow rate of the gas into the expansion chamber. Accordingly, the gas is drawn into the quasi-Venturi tube at the state of negative pressure, namely, at a pressure lower than the atmospheric pressure. The gas forms bubbles at negative pressure in the fluid flowing through the quasi-Venturi tube. The bubble-containing fluid is then introduced into an inner tank of a tank enclosure which further comprises an outer tank, and generates whirlpool in the inner tank. Due to the pressure of the ambient liquid, the size of the bubbles under negative pressure would further decrease, and accordingly the buoyancy is reduced. In addition, due to the effect of the whirlpool, the bubbles would not readily surface but remain in the liquid for an extended period of time, which in turn contributes to higher rate of gas dissolving in the liquid.

The pipe which supplies fresh liquid to the tank winds around the outer tank of the tank enclosure, and finally inserts into the inner tank, where the fresh liquid is blended with the bubble-carried fluid. The outer tank of the tank enclosure is connected to a cooling system so that the fluid in the inner tank of the tank enclosure and the fresh fluid in the winding pipe are cooled by the cooling water supplied by the cooling system.

With the characteristics of the cooled fluid, the bubbles at negative pressure, and the whirlpool, the apparatus according to the present invention may effectively increase the rate of gas dissolved in the liquid, and thus the object of the present invention is achieved.

In the present invention, since the mixer for generating bubbles at negative pressure and the tank enclosure are available at low cost, the entire apparatus which comprises such mixer and tank enclosure is also available at low cost. The cost effective installation of such apparatus contributes to the industrial applicability of the present invention.

The gas generator of the present invention can be an ozone generator, and therefore the apparatus according to the present invention can be easily converted to an apparatus for producing ozonated water with high concentration of ozone.

BRIEF DESCRIPTION OF THE DRAWINGS

These and other modifications and advantages will become even more apparent from the following detailed description of a preferred embodiment of the invention and from the drawings in which.

DETAILED DESCRIPTION OF THE INVENTION (PREFERRED EMBODIMENTS)

The present invention now will be described more fully hereinafter with reference to the accompanying drawings, in which a preferred embodiment of the invention is shown.

Figure 1:
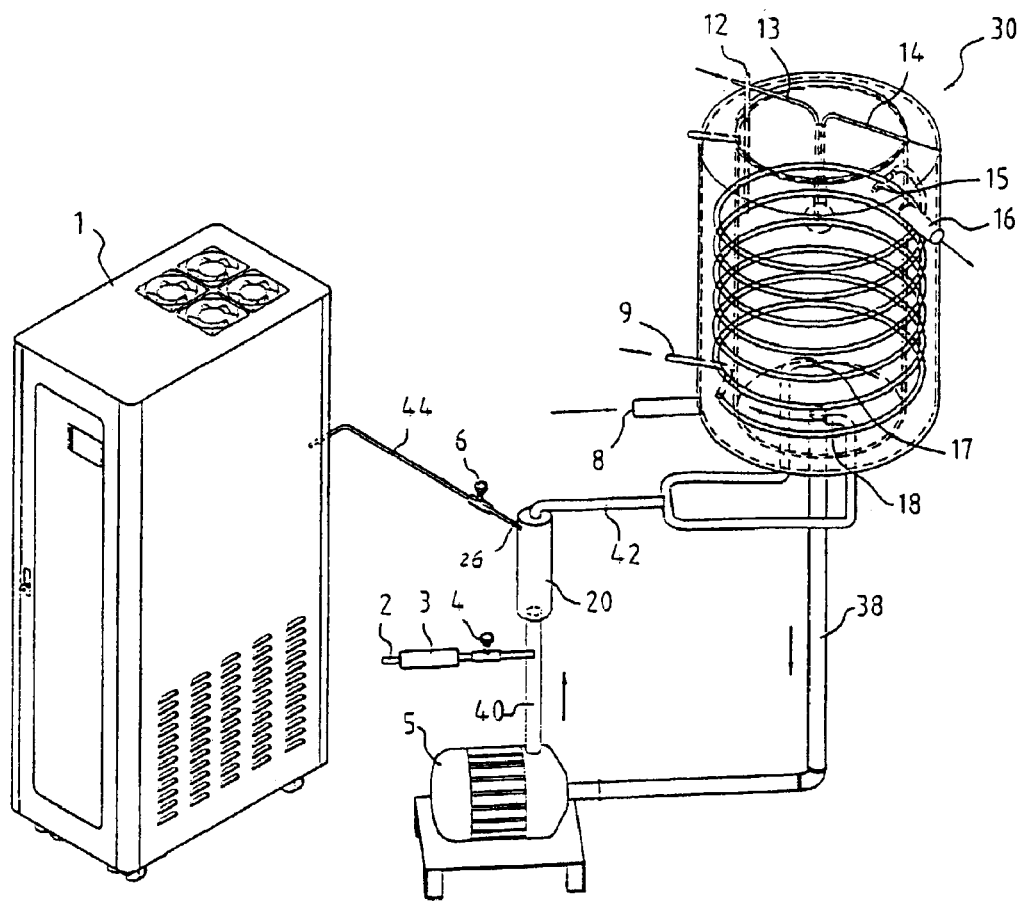
FIG. 1 shows the arrangement of the apparatus according to the present invention.

As shown in FIG. 1, the apparatus according to the present invention comprises primarily a gas generator 1, a mixer 20, a tank enclosure 30, and a pump 5.

The gas generator 1 is connected to a gas inlet 26 of the mixer 20 by a gas pipe 44. A valve 6 is arranged at the gas inlet 26 of the mixer 20.

Figure 2:
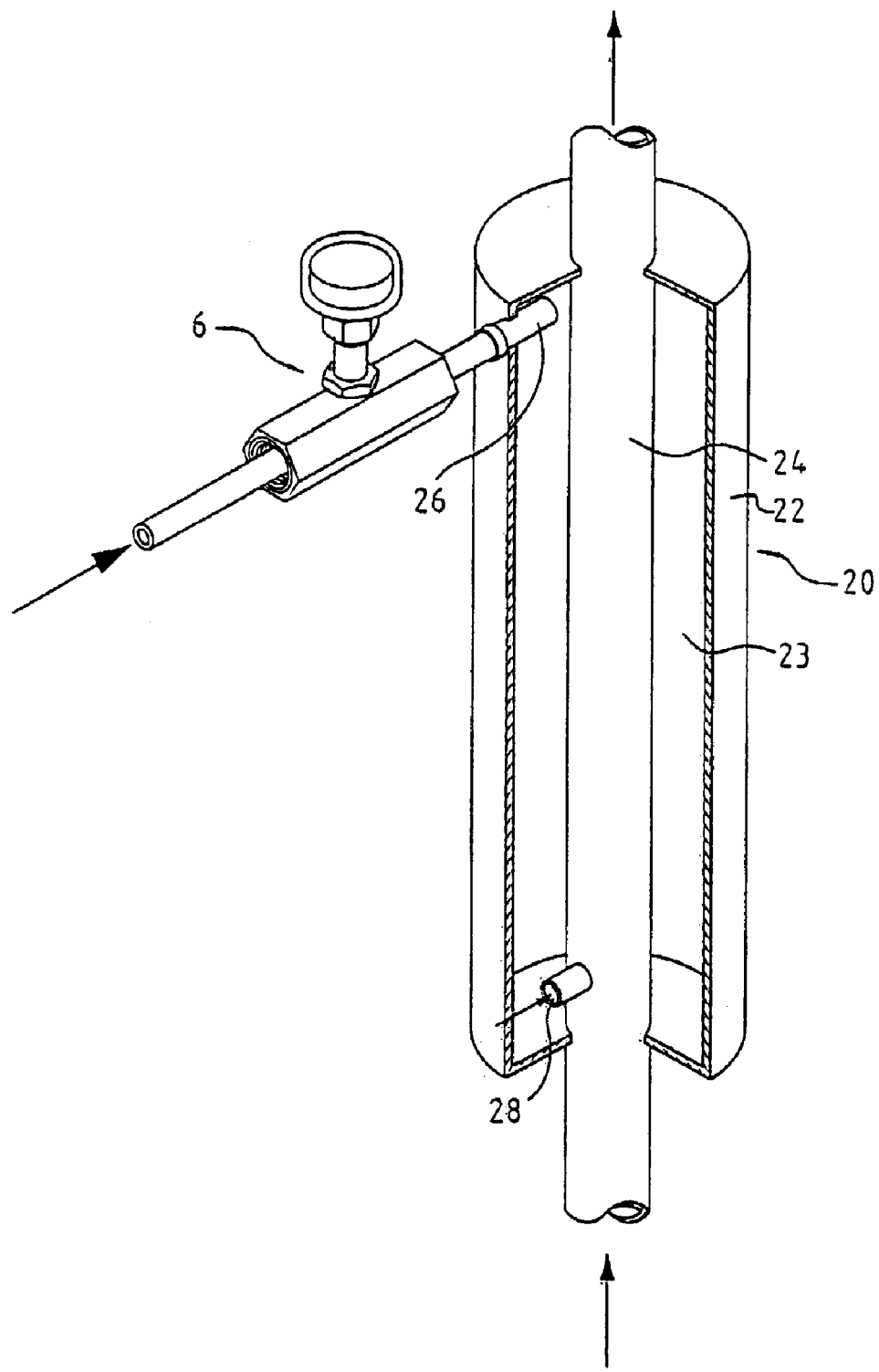
FIG. 2 is a schematic figure of the mixer of the apparatus shown in FIG. 1.

As shown in FIG. 2, the mixer 20 comprises: a container 22 and a quasi-Venturi tube 24. The container 22 is an axially extended enclosure with one end provided with the gas inlet 26. The gas inlet 26 is further provided with the valve 6 for regulating the flow rate of the incoming gas. The quasi-Venturi tube 24 has one end being a liquid inlet port and the other end being a liquid outlet port, and is axially arranged in the container 22 so that it passes through the container 22 from one end to the other end thereof, as shown by the arrows in FIG. 2. A throat (not shown) is formed within the tube 24 and is located generally in the midst thereof. A gas drawn-in port 28 is provided at a position on the wall of the tube 24, which is preferably distant from the gas inlet 26 of the container 22. The space inside the container 22 but outside of the quasi-Venturi tube 24 is referred to as an expansion chamber 23.

Figure 3:
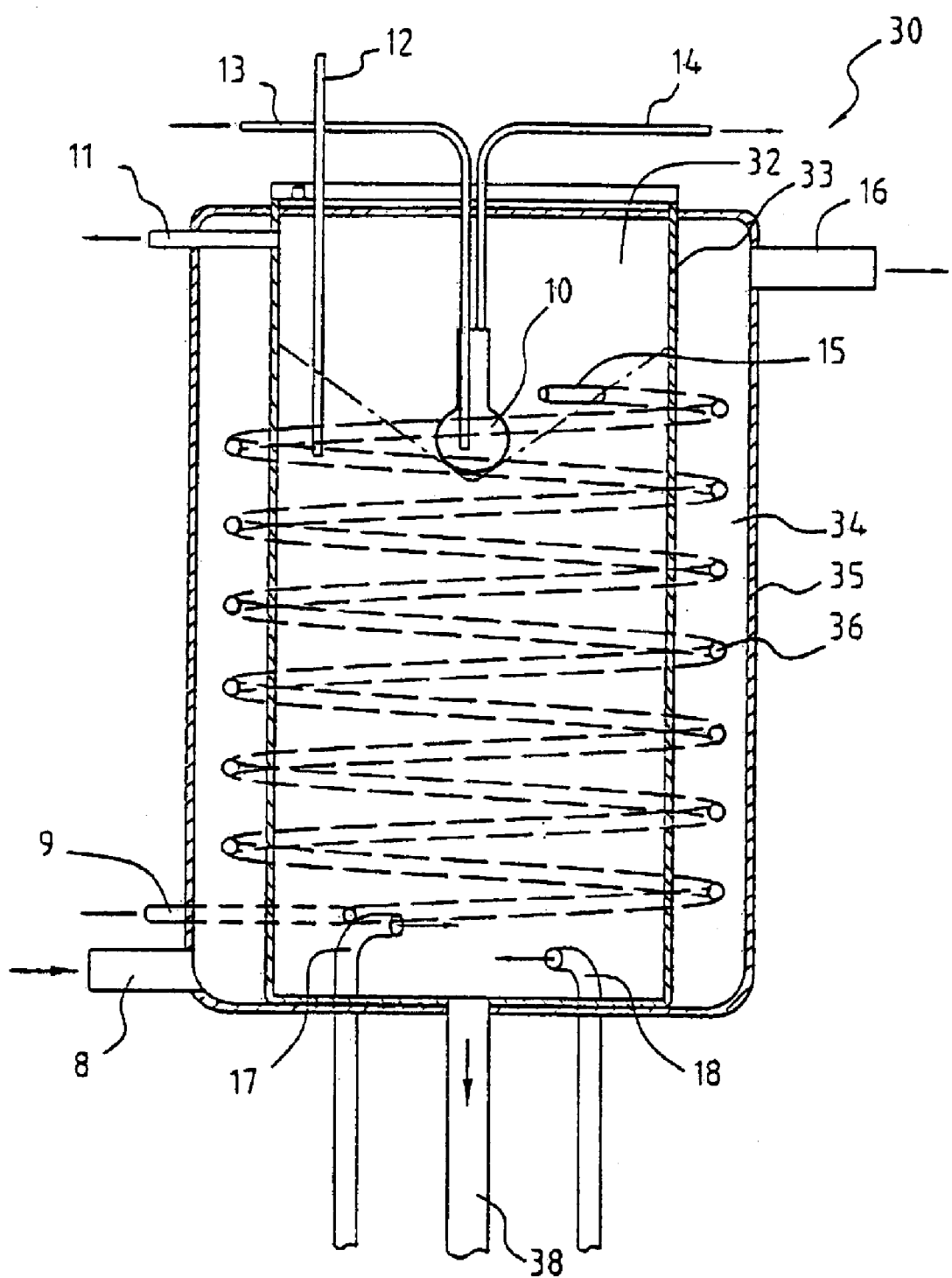
FIG. 3 is a schematic figure of the tank enclosure of the apparatus shown in FIG. 1.

The quasi-Venturi tube 24 is connected to the tank enclosure 30 through a liquid/gas tube 42 (FIG. 1). As shown in FIG. 3, the tank enclosure 30 primarily comprises an inner tank 32, an outer tank 34, and a winding pipe 36. The inner tank 32 has an inner tank wall 33; the outer tank 34 has an outer tank wall 35, which encloses the inner tank 32. A space is formed between the two tank walls 33, 35. The winding pipe 36 starts with a fresh liquid inlet 9, which enters the outer tank 34 and then winds around the inner tank wall 33, preferably in helical manner, and subsequently enters the inner tank 32, and ends at a fresh liquid inlet 15. The bottom of the tank enclosure 30 is provided with a liquid/gas output line 38, which is further connected to the inlet of the pump 5.

The outer tank 34 of the tank enclosure 30 is provided with a cooling water inlet 8 near the bottom thereof and is provided with a cooling water outlet 16 near the top thereof.

The tank enclosure 30 is further provided with an internal cooler 10 at the top center thereof. The internal cooler 10 is provided with cooling water circulating pipes, such as an auxiliary cooling water feeding pipe 13 and an auxiliary cooling water discharging pipe 14, arranged near the liquid surface inside the tank enclosure 30.

The tank enclosure 30 is optionally provided with an overflow exit 11 near the top thereof so as to prevent the liquid level from exceeding a predetermined height. A thermometer 12 is optionally provided to the inner tank 32 for monitoring the temperature therein.

During operation, the fluid is pumped by the pump 5 to flow through the quasi-Venturi tube 24 in the mixer 20 where a suction effect is thus created. The gas in the container 22 would be drawn into the quasi-Venturi tube 24 via the gas drawn-in port 28 due to the suction effect. The gas produced by the gas generator 1 enters container 22 via gas pipe 44, and diffuses therein. The valve of the gas pipe 44 regulates the gas flow so that the gas flow rate is lower than the rate of the gas drawn into the quasi-Venturi tube 24, so as to maintain a negative pressure in the expansion chamber 23.

The location of the gas inlet 26 of the container 22 and the location of the gas drawn-in port 28 are near the opposite ends of the container 22, respectively. With the arrangement, the gas can fully diffuse within the expansion chamber 23 before being drawn into the quasi-Venturi tube 24, and the pressure at the gas drawn-in port 28 can remain stable. The stable pressure facilitates the bubbles to be mixed in the liquid uniformly.

With the suction effect of the quasi-Venturi tube 24 and the flow regulation of the valve 6, the gas enters the quasi-Venturi tube 24 at negative pressure, and bubbles will be generated in the liquid at negative pressure (in relation to the atmospheric pressure). The volume of the bubbles at negative pressure would further decrease under the liquid pressure, and in turn reduce the buoyancy of the bubbles. The reduced buoyancy would allow the bubbles to be trapped in the liquid for an extended period of time. In other words, the bubbles would not emerge from the liquid and escape. The trapped bubbles facilitate the gas to dissolve in the liquid.

The liquid which carries the bubbles flows out of the mixer 20 and proceeds to enter the inner tank 32 of the tank enclosure 30 via the liquid/gas pipe 42. The liquid/gas pipe 42 is preferably divided into two paths before entering the tank enclosure 30. The divided pipes have outlets 17, 18 arranged in the inner tank 32 in parallel, horizontal manner, and in opposite directions. When liquid flows out from the divided pipes and enters the inner tank 32, the flow of the liquid creates a torque. The torque and the downward flow exiting from the liquid/gas output line 38 contribute to forming a whirlpool in the inner tank 32. The whirlpool enables the bubbles to rotate in the liquid, and the bubbles will suspend in the liquid for an extended period of time. These promote the gas to dissolve in the liquid.

The outer tank 34 of the tank enclosure 30 is supplied with cooling water from a cooling system. The cooling water enters the tank enclosure 30 from near the bottom thereof via the cooling water inlet 8, and flows out from near the top thereof via the cooling water outlet 16. The cooling water is used for cooling the liquid in the inner tank 32 and the fresh liquid flows along the winding pipe 36.

The fresh water is supplied from outside of the tank enclosure 30 via the fresh liquid inlet 9, and flows along the winding pipe 36 which winds around the inner tank wall 33. The fresh water enters the inner tank 32 near the top thereof via the fresh liquid inlet 15 and is mixed with the bubble-carrying liquid. The fresh liquid, as flowing along the winding pipe 35, is cooled by the cooling water in the outer tank 34 so that the temperature thereof can be lowered to provide a higher capability of dissolving gas as it is mixed with the liquid in the inner tank 32.

The internal cooler 10 is arranged near the top of the inner tank 32. Inside the internal cooler 10, cooling water is circulating for cooling the liquid inside the inner tank 32. The cooler 10 can be a spherical shape and be adjustably arranged at a location about the same level as the surface of the liquid at the center of the inner tank 32. The internal cooler 10 is arranged to assist the cooling of the liquid contained in the inner tank 32, and also to fill in the cavity formed in the center of the whirlpool in the inner tank 32 so that the air is prevented from contacting the liquid, and thus prevents air from dissolved in the liquid. With air dissolved in the liquid, the rate of the gas to be dissolved (such as ozone) in the liquid would be adversely affected.

The gas/liquid flowing out of the tank enclosure 30 can be extracted for use. In the installation shown in FIG. 1, the gas/liquid is extracted via a liquid/gas mixture outlet 2 arranged between the pump 5 and the mixer 20. Prior to the outlet 2, a liquid/gas mixture outlet valve 4 and a micro bubble filter 3 are optionally mounted in order to regulate the flow rate and to remove any suspended micro-bubbles that remain in the liquid.

It is known that water with high ozone concentration (80 ppm) has been widely applied to semiconductor water cleaning. With the gas generator 1 replaced with an ozone generator, the apparatus according to the present invention can be converted to one for producing ozone water of high ozone concentration.

With the construction and the operation as described above, the gas to be dissolved in the liquid forms bubbles at negative pressure. The bubbles are characterized in smaller size and less buoyancy in the liquid, which in turn may be retained in the liquid for an extended period of time. In addition, the whirlpool generated in the liquid helps retain the bubbles in the liquid. With the negative pressure and whirlpool effects, the capability of the liquid for dissolving gas would significantly improve if the liquid has already been under low temperature.

It will thus be seen that the invention efficiently attains the objects set forth above, among those made apparent from the preceding description. Since certain changes may be made in the above constructions without departing from the scope of the invention, all matter contained in the above description or shown in the accompanying drawings are intended to be interpreted as illustrative and not in a limiting sense.

What is claimed is:

1. An apparatus for dissolving gas into liquid, comprising:
   a mixer comprising:
   an axially extending container, having a gas inlet and a valve for regulating flow rate of gas entering the container;
   a quasi-Venturi tube axially arranged in the container, with one end of the quasi-Venturi tube being a liquid inlet port and the other end being a liquid outlet port, the quasi-Venturi tube having a tube wall being provided with a gas drawn-in port;
   a tank enclosure, comprising:
   an inner tank having a wall;
   an outer tank having a wall enclosing the inner tank and forming a space between the wall of the inner tank and the wall of outer tank;
   a winding pipe having an inlet and an outlet and extending from outside to inside of the outer tank and winding around the inner tank and passing through the wall of the inner tank with the outlet arranged inside of the inner tank;
   a liquid/gas output line provided at a bottom of the tank enclosure;
   a liquid/gas pipe with one end thereof connecting to the liquid outlet port of the quasi-Venturi tube and the other end thereof connecting to the bottom of the tank enclosure and inserting into inside of the tank enclosure so that the liquid flowing out of the liquid/gas pipe forms a whirlpool inside the tank enclosure;
   a pump having an outlet port connecting to the liquid inlet port of the quasi-Venturi tube and an inlet port connecting to the liquid/gas output line; and
   a liquid/gas mixture outlet provided between the outlet port of the pump and the liquid inlet port of the quasi-Venturi tube.

2. The apparatus according to claim 1, wherein the tank enclosure is provided with a cooling water inlet and a cooling water outlet at a vicinity of each of a bottom and top, respectively, of the tank enclosure.

3. The apparatus according to claim 2, further comprising an internal cooler, the internal cooler having a cooling water circulating pipe adjustably arranged near liquid surface inside the tank enclosure.

4. The apparatus according to claim 3, wherein the internal cooler has a shape of a hollow sphere.

5. The apparatus according to claim 1, wherein the gas inlet of the container of the mixer is installed near one end of the container, and the gas drawn-in port is installed at the location distal from the gas inlet.

6. The apparatus according to claim 1, wherein the liquid/gas pipe is divided into two pipes after extending out from quasi-Venturi tube, and the two pipes insert into the inside of the tank enclosure from the bottom thereof, the two pipes having outlets that are oriented in parallel but in opposite directions.

7. The apparatus according to claim 1, wherein the winding pipe winds around the tank enclosure in helical manner.

8. The apparatus according to claim 1, further comprising a gas generator connected to the valve of the container.

9. The apparatus according to claim 8, wherein the gas generator is an ozone generator.

* * * * *